US009997055B2

(12) United States Patent
Ball

(10) Patent No.: US 9,997,055 B2
(45) Date of Patent: Jun. 12, 2018

(54) SOCIAL ALARM SYSTEM WITH LOCATION DETECTION IN A DWELLING

(71) Applicant: Tunstall Healthcare (UK) Ltd, Yorkshire (GB)

(72) Inventor: Edward Andrew Ball, Yorkshire (GB)

(73) Assignee: Tunstall Healthcare (UK) Ltd, Yorkshire (GB)

( * ) Notice: Subject to any disclaimer, the term of this patent is extended or adjusted under 35 U.S.C. 154(b) by 0 days. days.

(21) Appl. No.: 15/175,532

(22) Filed: Jun. 7, 2016

(65) Prior Publication Data

US 2016/0358455 A1 Dec. 8, 2016

(51) Int. Cl.
| | | |
|---|---|---|
| *G08B 1/08* | (2006.01) | |
| *G08B 25/01* | (2006.01) | |
| *G01S 5/00* | (2006.01) | |
| *G08B 21/02* | (2006.01) | |
| *G08B 25/10* | (2006.01) | |
| *G01S 5/02* | (2010.01) | |
| *G08B 21/04* | (2006.01) | |

(52) U.S. Cl.
CPC .............. *G08B 25/016* (2013.01); *G01S 5/00* (2013.01); *G01S 5/0252* (2013.01); *G08B 21/0272* (2013.01); *G08B 25/10* (2013.01); *G08B 21/043* (2013.01)

(58) Field of Classification Search
CPC .............................. G08B 25/016; G08B 21/04
USPC ......... 340/539.13, 506, 539.21, 573.1, 13.24
See application file for complete search history.

(56) References Cited

U.S. PATENT DOCUMENTS

| 4,494,119 A | 1/1985 | Wimbush et al. |
| 5,305,370 A * | 4/1994 | Kearns ................... H04M 11/04 |
| | | 379/38 |
| 5,485,163 A * | 1/1996 | Singer ................... G01S 5/0054 |
| | | 340/7.27 |
| 5,661,492 A * | 8/1997 | Shoap ................... G01S 13/878 |
| | | 340/502 |
| 5,971,921 A * | 10/1999 | Timbel ................. G08B 25/016 |
| | | 128/904 |
| 2007/0132577 A1 * | 6/2007 | Kolavennu ............. G01S 5/021 |
| | | 340/539.13 |

(Continued)

FOREIGN PATENT DOCUMENTS

| GB | 2415558 A | 12/2005 |
| WO | 2014060777 A2 | 4/2014 |
| WO | 2014060777 A3 | 8/2014 |

*Primary Examiner* — Phung Nguyen
(74) *Attorney, Agent, or Firm* — Murphy, Bilak & Homiller, PLLC

(57) ABSTRACT

A social alarm system provides location detection within a dwelling. A personal radio trigger unit is carried by a client and transmits an alarm signal in response to a triggering event, such as by a manual alarm button or an automatic fall detection circuit. A client unit is operable to receive the alarm signal and initiate an alarm call to a remote monitoring center over a communications network. A plurality of radio receptor nodes monitor the wireless RF transmissions from the personal radio trigger to report respective received signal strength values. A location finder unit determines a location of the personal radio trigger, by using absolute error calculations and/or shape error calculations against previously recorded known locations in the dwelling.

20 Claims, 12 Drawing Sheets

(56) References Cited

U.S. PATENT DOCUMENTS

2009/0203971 A1* 8/2009 Sciarappa .......... G08B 21/0453
                                                          600/301
2010/0234044 A1   9/2010 Lohbihler
2015/0119079 A1* 4/2015 Tarlazzi ................ G01S 5/06
                                                          455/456.1

* cited by examiner

SOCIAL ALARM SYSTEM WITH LOCATION DETECTION IN A DWELLING

RELATED APPLICATIONS

This application claims priority under 35 U.S.C. §119 to Application No. 1509918.7 filed Jun. 8, 2015 in the United Kingdom, the entire disclosure of which is incorporated by reference herein.

TECHNICAL FIELD

The present application relates generally to the field of social alarm systems, and more particularly to a social alarm system able to perform location detection within a dwelling.

BACKGROUND

Typically, a social alarm system monitors the safety and wellbeing of a client in their dwelling, such as in their own home or in a sheltered housing scheme. Often, a social alarm client unit is installed in the dwelling and is arranged to initiate an alarm call to a remote monitoring center when an alarm event is detected. As particular examples, the alarm may be triggered by the client pressing an alarm button on the social alarm client unit itself or on a personal radio trigger unit such as pendant.

The client unit may use data signaling to inform server apparatus at the control center of the alarm event. The control center apparatus may allow an operator terminal to open a voice communication path and talk with the client via the client unit. The voice communication path is very helpful in order to immediately reassure the client and asses their need for further care. If appropriate, a caregiver or medic can be dispatched to the dwelling to help the client. Therefore, it is important that the system should operate correctly and reliably at all times.

Some of these alarm events can have serious consequences. For example, the client may suffer a fall, leading to an automatically initiated alarm call to the control center. Therefore, it is desired to know the location of the client at their dwelling. An indication of the location of the client can be vitally important, e.g. so that a caregiver or medic can reach the client more quickly. However, there is currently no useful mechanism in a social alarm system for indicating the location of the client.

Generally, it is desired to address one or more of the disadvantages associated with the related art, whether those disadvantages are specifically discussed herein or will be otherwise appreciated by the skilled person from reading the following description.

SUMMARY

According to the present invention there is provided an apparatus and method as set forth in the appended claims. Additional features of the invention will be apparent from the dependent claims, and the description which follows.

In one example there is described a social alarm system which provides location detection within a dwelling. A personal radio trigger unit is carried by a client and transmits an alarm signal in response to a triggering event, such as by a manual alarm button or an automatic fall detection circuit. A client unit receives the alarm signal and initiates an alarm call to a remote monitoring center over a voice & data communications network, such as PSTN, GSM or Internet. A plurality of radio receptor nodes monitor wireless RF transmissions from the personal radio trigger to report respective received signal strength values. A location finder unit determines a location of the personal radio trigger, such as by using absolute error calculations and/or shape error calculations against previously recorded known locations in the dwelling.

In one example there is described a social alarm system with location detection in a dwelling, comprising: a personal radio trigger configured to be carried by a client in the dwelling and operable to transmit an alarm signal by wireless radio frequency transmission in response to a triggering alarm event; a client unit operable to receive the alarm signal and initiate an alarm call to a remote monitoring center over a communications network; a plurality of radio receptor nodes operable to monitor the wireless radio frequency transmissions from the personal radio trigger, each radio receptor node being configured to report at least one respective received signal strength value; and a location finder unit operable to determine a location of the personal radio trigger in the dwelling according to the received signal strength values reported from the plurality of radio receptor nodes.

In one example, the plurality of radio receptor nodes are distributed at separate locations around the dwelling.

In one example, at least one of the radio receptor nodes comprises a plurality of antennas as a multi-antenna array.

In one example, the plurality of radio antennas in the radio receptor node are spaced apart from each other by a distance D corresponding to a local null of the wireless radio transmissions in the dwelling.

In one example, at least one of the plurality of antennas is separated from a main board of the radio receptor node and connected thereto by a flying lead wire.

In one example, each of the radio receptor nodes further comprises a controller operable to determine a received signal level from each of the plurality of antennas of that radio receptor node and to derive the received signal strength value therefrom as reported by the respective radio receptor node to the location finder unit.

In one example, the radio receptor nodes are coupled to the location finder unit by a backhaul network which is distinct from the wireless radio transmissions.

In one example, the location finder unit is located at a server apparatus remote from the dwelling.

In one example, the location finder unit performs a location finding algorithm comprising: receiving observed signal values from the plurality of nodes, comparing the observed values against previously recorded values from a plurality of known locations in the dwelling, and determining a current location of the personal radio trigger from amongst the plurality of known locations.

In one example, the location finder unit stores a set of power levels from each of the plurality of nodes for each of the observed recorded values, wherein the set of power levels are ordered by location of the nodes and the observed signal values are provided in the same location order.

In one example, the location finding algorithm selects amongst the known locations according to absolute power levels from each of the M radio receptor nodes for each of the set of L known locations, where L and M are positive integers, against the current observed signal values according to provide an absolute power error against the current observed signal values 'p' according to the equation:

$$\text{Abs\_power\_error}(p) = \sqrt{\frac{\sum_{k=1}^{M}[\text{MAX}(\text{Node}(k)) - LUT(k, p)]^2}{M}} \quad \text{(Eq. 1)}$$

In one example, the location finding algorithm selects amongst the known locations according to normalized power levels from each of the M radio receptor nodes for each of the set of L known locations, where L and M are positive integers, against the current observed signal values 'p' according to provide a shape power error according to the equations:

$$\text{Node\_Norm} = \text{Node} - \text{MAX}(\text{Node}(1 \ldots M)) \quad \text{(Eq. 2)}$$

$$\text{LUT\_Norm}(p,1 \ldots M) = \text{LUT}(p,1 \ldots M) - \text{MAX}(\text{LUT}(p,1 \ldots M)) \quad \text{(Eq. 3)}$$

$$\text{Shape\_error}(p) = \sqrt{\frac{\sum_{k=1}^{M}[\text{MAX}(\text{Node\_Norm}(k)) - \text{LUT\_Norm}(k, p)]^2}{M}} \quad \text{(Eq. 4)}$$

In one example, the location finding algorithm selects amongst the known locations according to a combined error value based on both of the absolute power error and the shape power error. In one example a weighting is applied to each error.

In one example, the location finder unit is operable to report two or more of the selected known locations as being the current location of the personal radio trigger with a relative confidence rating for each said known location.

In one example, the social alarm system further comprises one or more anchor transmitters arranged at fixed locations in the dwelling and operable to emit the wireless radio transmissions similar to the personal radio trigger, and wherein the location finder unit is further operable to compare the observed signal values against observations of the anchor transmitters when determining a location of the personal radio trigger in the dwelling.

In one example, the location finder unit is operable to make a binary determination of location of the personal radio trigger as being in one of 'inside' or 'outside' at the dwelling.

In one example, the personal radio trigger is operable to emit the wireless radio transmission using a reserved frequency band in the range 100 MHz to 1 GHz.

In one example, the personal radio trigger is configured as a pendant to be worn by the client and comprises an alarm button operable to manually initiate the triggering alarm event and/or a fall detector circuit operable to automatically initiate the triggering alarm event.

In one example there is described a method of location finding in a dwelling by a social alarm system, comprising: transmitting an alarm signal by wireless radio frequency transmission in response to a triggering alarm event from a personal radio trigger carried by a client in the dwelling; receiving the alarm signal at a client unit and initiating an alarm call to a remote monitoring center over a communications network; monitoring the wireless radio frequency transmissions from the personal radio trigger by a plurality of radio receptor nodes to report at least one respective received signal strength value; and determining a location of the personal radio trigger in the dwelling according to the received signal strength values reported from the plurality of radio receptor nodes.

In one example there is described a method including comparing the received signal values against previously stored values for a plurality of known locations in the dwelling to derive an error value for each location; and selecting a current location of the personal radio trigger from amongst the plurality of known locations in the dwelling according to the error values.

As will be discussed in more detail below, the example embodiments address many of the difficulties of the related art. These and other features and advantages will be appreciated further from the following example embodiments.

BRIEF DESCRIPTION OF THE DRAWINGS

For a better understanding of the invention, and to show how example embodiments may be carried into effect, reference will now be made to the accompanying drawings in which.

DETAILED DESCRIPTION

Figure 1:
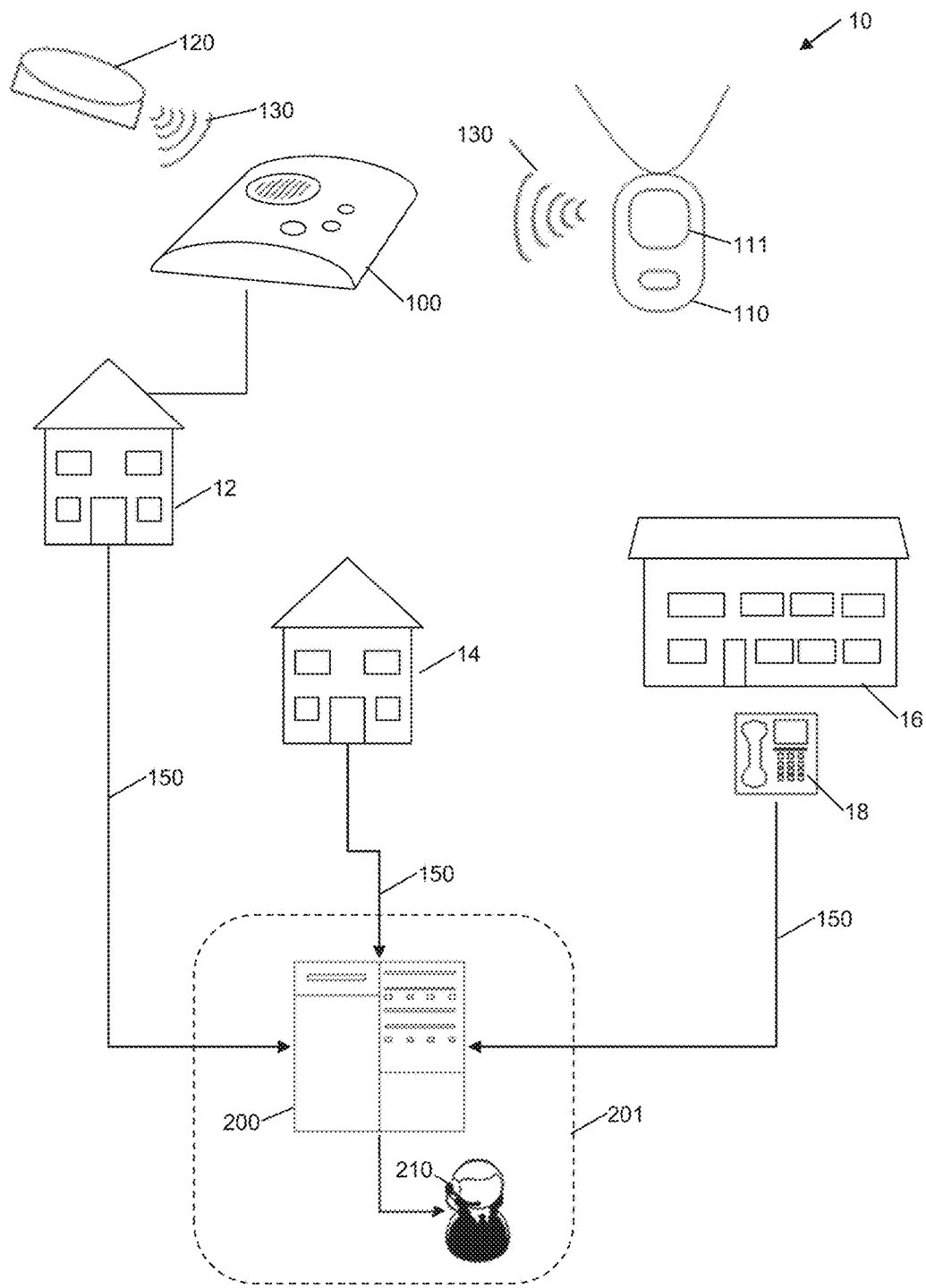
FIG. 1 is a schematic diagram of an example social alarm system.

The example embodiments will be described particularly with reference to a social alarm system as shown in the drawings. However, it will be appreciated that the described apparatus and method could also be applied in many other specific implementations, as will be apparent to persons skilled in the art from the teachings herein.

FIG. 1 is a schematic diagram showing an example social alarm system. In this example embodiment, the social alarm system 10 comprises a plurality of social alarm client units 100 which are connected in use to a social alarm server apparatus 200 at a remote monitoring center 201 through a communications network 150. Suitably, the communications network 150 is capable of carrying both voice signals and data signaling. The voice signals may be carried as an audio signal and the data signaling may, for example, use in-band audio tones such as DTMF tones or other audio signaling tones. In another example, data signaling may be carried in a separate channel, such as with an Internet Protocol (IP) data path. The server 200 may link an alarm call though to an operator terminal 210. The received alarm data may be displayed to the operator and the voice channel can be used to talk to the client via the client unit 100.

The communications network 150 suitably includes a public telephone network, such as by combining land-lines (e.g. a Plain Old Telephone System, POTS), cellular mobile telecommunications, and/or Voice-over-Internet Protocol (VoIP) communications. The communications network 150 is suitably capable of providing communications over a wide area, such as over a distance of tens or hundreds of kilometers. Typically, one monitoring center 201 covers a number of towns or cities spread out geographically in a particular country or region.

The monitoring center 201 is linked to various client dwellings 12, 14, 16, which are typically domestic homes. Often, the system is retro-fitted in to the client's own house and is adapted or augmented as the needs of that client are assessed and change over time. Typically, the client is an elderly or infirm person who has health or mobility difficulties. As another example, the client dwelling might be a sheltered housing complex 16 which is sub-divided into separate apartments or houses on a particular site. In this example, a warden station 18 may be linked locally to the client units 100 for an on-site response. However, the system normally still relies on the monitoring center 201 at certain times or for certain types of events, such as for a night-time back-up monitoring service. Typically, installation of each client unit 100 requires a skilled engineer, with subsequent regular visits for inspection and maintenance.

More recently, such social alarm systems have become more complicated and may include a wide variety of sensors 120. As examples, the sensors 120 may include passive infra-red movement detectors, a bed or chair occupancy sensor, electrical appliance usage sensor, and door usage sensors, amongst many others. These sensors 120 may be provided at suitable locations around the dwelling of the client in order to monitor the daily activities of the client. The sensors 120 may include any suitable 'telecare' sensor or combination of sensors. The remote sensors 120 may include bed/chair occupancy sensors, pressure mats, and/or environmental sensors (e.g. carbon monoxide, natural gas), amongst others. In particular, the sensors 120 may raise alerts or alarm events if certain conditions are detected—e.g. a gas sensor detecting natural gas (implying that a gas cooker has been left on by the client). Of course, each sensor 120 has a capital cost and will need to be properly installed and maintained to ensure continued safe operation of the system. Therefore, there is a desire to minimize the number of sensors 120 which are needed in each dwelling.

Suitably, the sensors 120 communicate with the client unit 100 over short range wireless radio transmission, or may be wired to the client unit 100. Physical wiring has the advantage of increased durability and reliability, but installation then is more costly and intrusive and the system is less flexible in the long term. A wireless connection 130 is often preferred, but may introduce connectivity issues.

The client may carry a personal radio trigger unit 110. The trigger unit 110 may include an alarm button 111 which allows the client to manually initiate an alarm event via the client unit 100. In some examples, the personal trigger unit 110 may include a microphone and speaker to carry a voice audio channel to the client. In some examples, the personal trigger unit 110 may include a fall detector unit which is arranged to detect that the client has fallen and initiate a corresponding fall alarm event via the client unit 100. The personal trigger unit 110 may be carried or worn by the client, and may be provided in various configurations, such as a belt, a wrist strap, or a pendant, among others. Given that the personal trigger 110 is to be worn or carried around by the client, a wireless connection 130 to the client unit 100 is used.

Figure 2:
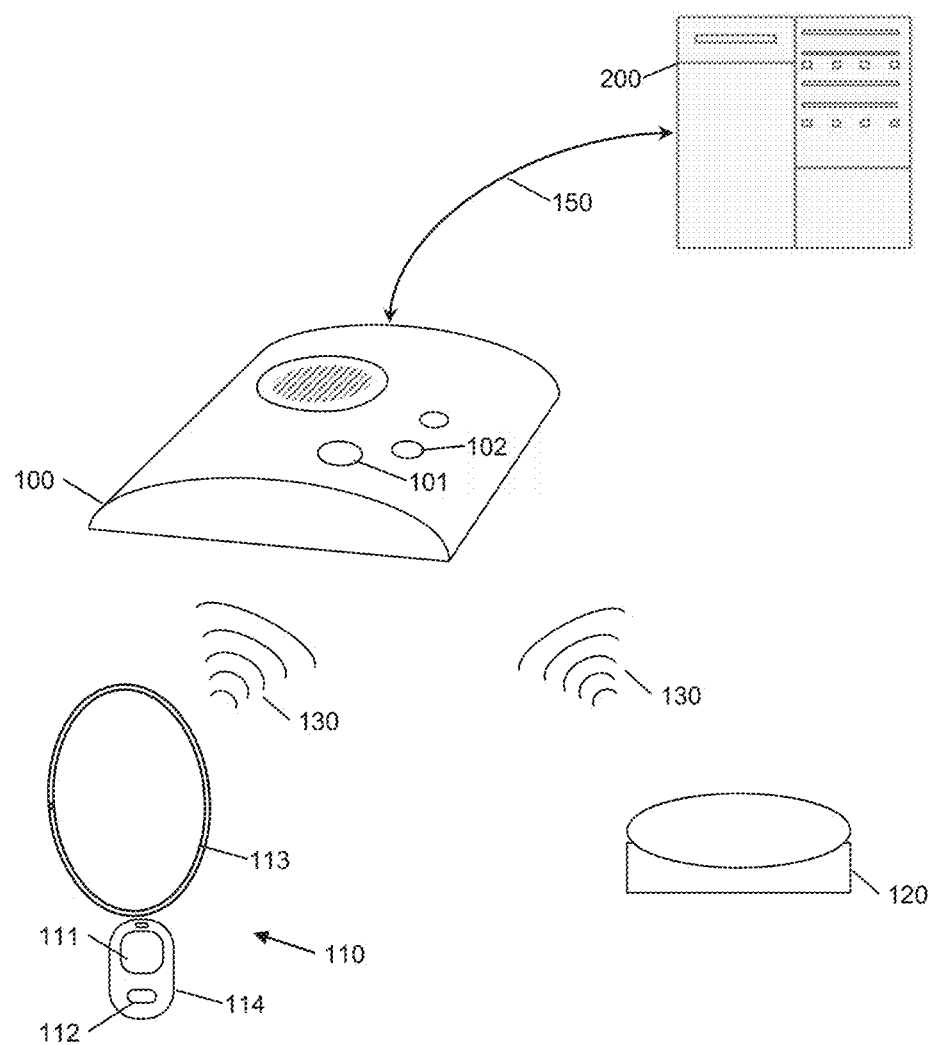
FIG. 2 is a schematic view of an example client unit and personal radio trigger unit.

FIG. 2 shows the example social alarm system in more detail. In this example, the example client unit 100 has a simple and straightforward user interface which is suitable for use by a wide range of people of differing abilities. Typically, the client unit 100 includes, inter alia, a readily identified "alarm" button 101, so that the client may manually trigger an alarm event. The client unit 100 may also include a "cancel" button 102. e.g. to cancel an unintentional alarm event, control the various functions of the client unit, or respond to verbal instructions provided by the care operator over the voice communications channel.

As noted above, the personal trigger unit 110 is configured to be worn or carried by the client. As examples, the personal trigger unit 110 may be worn on the wrist or on a belt, or attached to a key ring, for example. In the example embodiments, the personal trigger unit 110 is provided as a pendant worn around the neck of the client with a lanyard 113 supporting a main housing 114. In use, the housing 114 rests on the client's chest, suitably at or about their breastbone. In this configuration, a fall detector unit within the housing 114 is well placed to monitor and detect a fall event, while being relatively comfortable and unobtrusive for the client.

In this example, the personal trigger unit 110 provides a radio trigger function, by transmitting a wireless radio signal to the client unit 100. The personal radio trigger unit 110 may incorporate an alarm button 111 so that the user may manually raise an alarm call even when they are not in close proximity to the client unit 100. The unit 110 may also include a cancel button 112 which, similar to the cancel button 102 on the client unit, may be used to cancel an unintentional alarm event.

The personal trigger unit 110 is coupled to the client unit 100 by any suitable form of wireless communication interface 130. In one example embodiment, the personal trigger unit 110 communicates with the client unit 100 over a short range wireless radio transmission, e.g. using an ETSI EN300 220-2 (2010) Category 1 radio receiver or radio transceiver.

The client unit 100 may thus raise various types of alarm events and signal these alarm events to the server apparatus 200, based on the activity of the client as monitored by the personal radio trigger unit 110 and/or the remote sensors 120. Typically, the client unit 100 is configured to initiate an outgoing telephone call by seizing the telephone line (going off-hook) and dialing a pre-programmed telephone number of the remote monitoring center 201 where the server 200 is located. The server 200 answers the incoming call and an audio path is established. In one example, data signaling (e.g. in-band audio DTMF tones or other tones, or another data path such as Internet Protocol) allows the client unit 100 to exchange data messages with the server 200. These data messages may include a serial number or identity of the client unit 100 making the call, a coded indication of the nature of the triggering event giving rise to the call, and so forth. In response, the server 200 may log the call and transfer control of the telephone line to an operator terminal 210, and the operator may then study the call data from the data messages and/or speak to the client via the client unit 100.

There are times when it is vital to attend the client in person to give an urgent response. The operator may, for example, summon emergency medical services to attend the client's house. In this situation, it would be very helpful to know the location of the client within their house. If the system were to be able to give an accurate and reliable indication of the location, then the client can be found and given help more quickly. A system which is capable of improving response times, even if by a matter of minutes or seconds, is still valuable in these situations.

In general, a dwelling is the space in which a person resides. The dwelling may include a house and one or more other buildings or structures (e.g. sheds, garages, outbuildings), and may include a curtilage as the land immediately around those buildings.

A difficulty arises in that most houses are relatively confined spaces. Houses typically have an area of 50-100 m2 and room sizes are typically 10-20 m2. Of course these sizes vary considerably depending on the nature of the house, e.g. whether the client is living in a large family house or in a one-person accommodation. Houses typically have a relatively dense construction and thus are difficult environments in which to achieve a constant and reliable wireless connection. Hence, it is difficult to provide a location detection system which is effective in this environment. Many houses have multiple floors or levels, and thus location in three dimensions would be important, e.g. to determine whether the client is upstairs or downstairs.

A further difficulty is that the client may be near to their house when the alarm incident arises, but not within the house. For example, they may actually have fallen while in the garden, in their shed or garage, on a driveway, or while nearby such as in a neighboring house or garden. In this case, the wireless link from the personal trigger 110 to the client unit 100 can be still within range, leading to the alarm event being activated at the monitoring center 201, but response times would be significantly delayed by a futile search inside the house for the client. Many other specific scenarios are of course also possible, as will be understood from the description herein.

Figure 3:
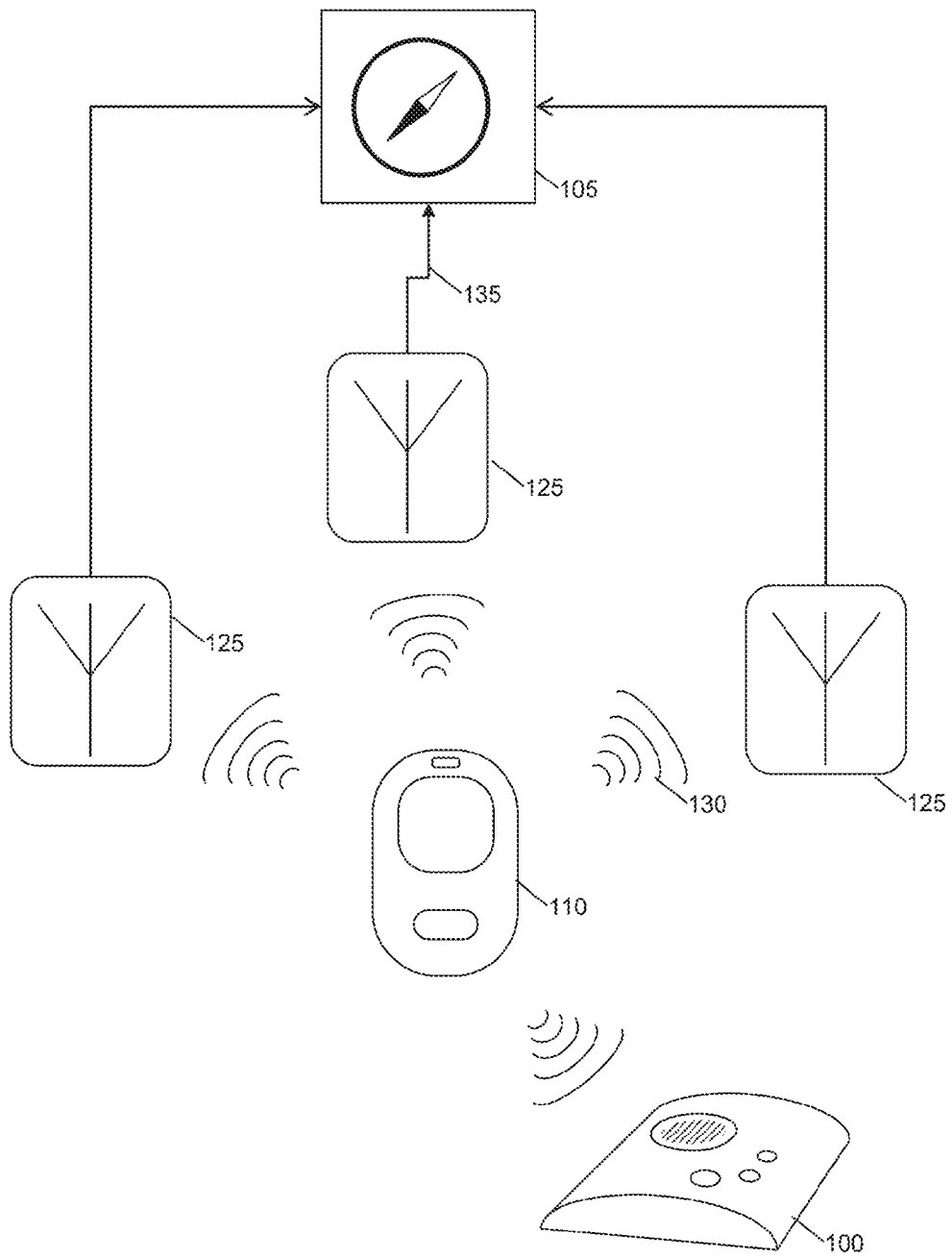
FIG. 3 is a schematic view of an example location detection apparatus for the social alarm system.

FIG. 3 is a schematic view of an example location detection mechanism for use with the social alarm system described above. A plurality of wireless radio receptor nodes 125 are provided at suitable locations in or around the dwelling 12. The personal radio trigger (e.g. pendant) 110 carried by the client is operable to transmit an alarm signal by wireless radio frequency transmission in response to a triggering alarm event, such as by the client pressing the alarm button 111 or by operation of an automatic fall detector circuit. The client unit 100 is configured to receive the alarm signal and initiate an alarm call to the remote monitoring center 201 over the communications network 150. The plurality of radio receptor nodes 125 are arranged to monitor the wireless radio frequency transmission from the personal radio trigger 110, each radio receptor node 125 being configured to report one or more respective received signal strength values. A location finder unit 105 is configured to determine a location of the personal radio trigger 110 carried by the client according to the set of received signal strength values reported from the plurality of radio receptor nodes 125.

Figure 4:
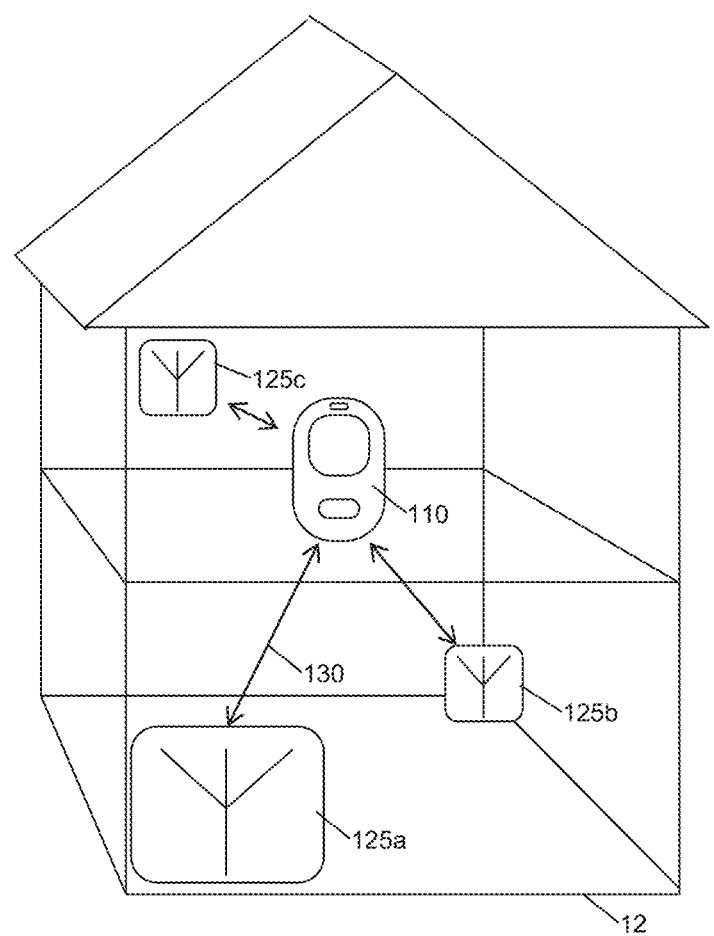
FIG. 4 is a schematic view of the location detection apparatus in use.

FIG. 4 shows an example distribution of the radio receptor nodes 125 around a particular dwelling 12. In this case, a first radio receptor node 125a is provided on a ground floor level in this example at a front of the dwelling, a second node 125b is installed at a first floor level, and a third node 125c is provided at a rear of the property. Any suitable number of nodes may be installed in a particular dwelling. Preferably, at least three radio receptor nodes are installed. The radio receptor nodes 125 are suitably distributed in a spaced apart relation around the dwelling 12. The exact location of each radio receptor node 125 will be dependent upon the individual installation, but a separation of the nodes from each other and distribution around the dwelling is desirable. The radio receptor nodes 125 in use receive the wireless radio transmissions from the personal radio trigger unit 110. These wireless radio transmissions 130 are sent particularly in response to triggering of an alarm event, but may also be sent at other times. For example, a regular monitoring signal or 'heartbeat' signal may be sent at regular intervals. In another example, the trigger 110 may be polled with a command, e.g. from or via the client unit 100, or directly from the monitoring center 201, and requested to emit a radio transmission.

In some example embodiments, the wireless radio transmissions 130 use a reserved frequency in the radio spectrum. Suitably, a UHF (Ultra-High Frequency) band is used, such as in the range 100 MHz-1 GHz. In one example, the radio transmission uses a frequency in the range 800-900 MHz, preferably 850-875 MHz and most preferably 865-875 MHz. As an example, the 869 MHz frequency band is reserved for telecare appliances in the United Kingdom. As another example, the 169 MHz band is also used in some telecare equipment in the UK. However, these UHF radio frequency bands can experience disruption in a reflective environment, as would be encountered in many typical dwellings.

Figure 5:
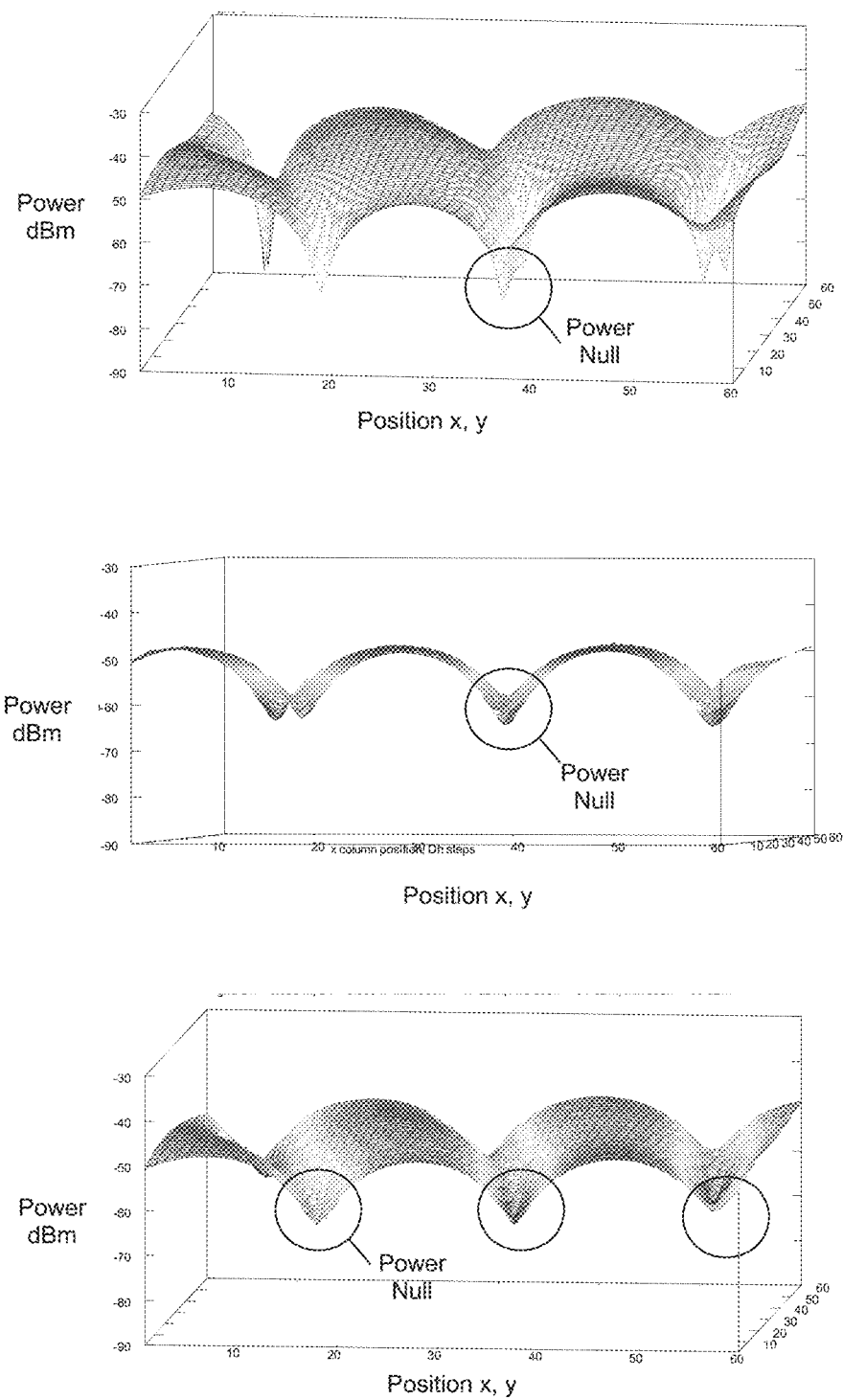
FIG. 5 is a graph of simulated data for radio frequency analysis.

FIG. 5 shows graphs of simulated analysis of signals at 869 MHz in a 3 m×3 m reflective environment, showing X and Y locations on the respective x and y axes, and relative signal strength indications (RSSI) on the z axis. For a stationary signal source assuming 1 direct ray and 2 reflected rays, these graphs illustrate significant variation in the local maximum and minimum received signal strengths. Therefore, depending on the exact location and orientation of the trigger 110 at the time of transmission, the received signal strength at a particular static radio receptor node 125 may vary significantly (e.g. by 20 to 30 dB, or more). Even minor adjustments in the location or orientation of the transmitting trigger 110 may significantly alter the experienced received signal strength, giving a misleading signal for the location finding system. Likewise, any changes in the local environment can significantly alter the signal strength as between one instance and another, even though the trigger 110 is in the same location. Thus, considering these properties of UHF radio transmissions, there is a significant challenge in using UHF radio transmissions, such as the 869 MHz band, for location detection.

Figure 6:
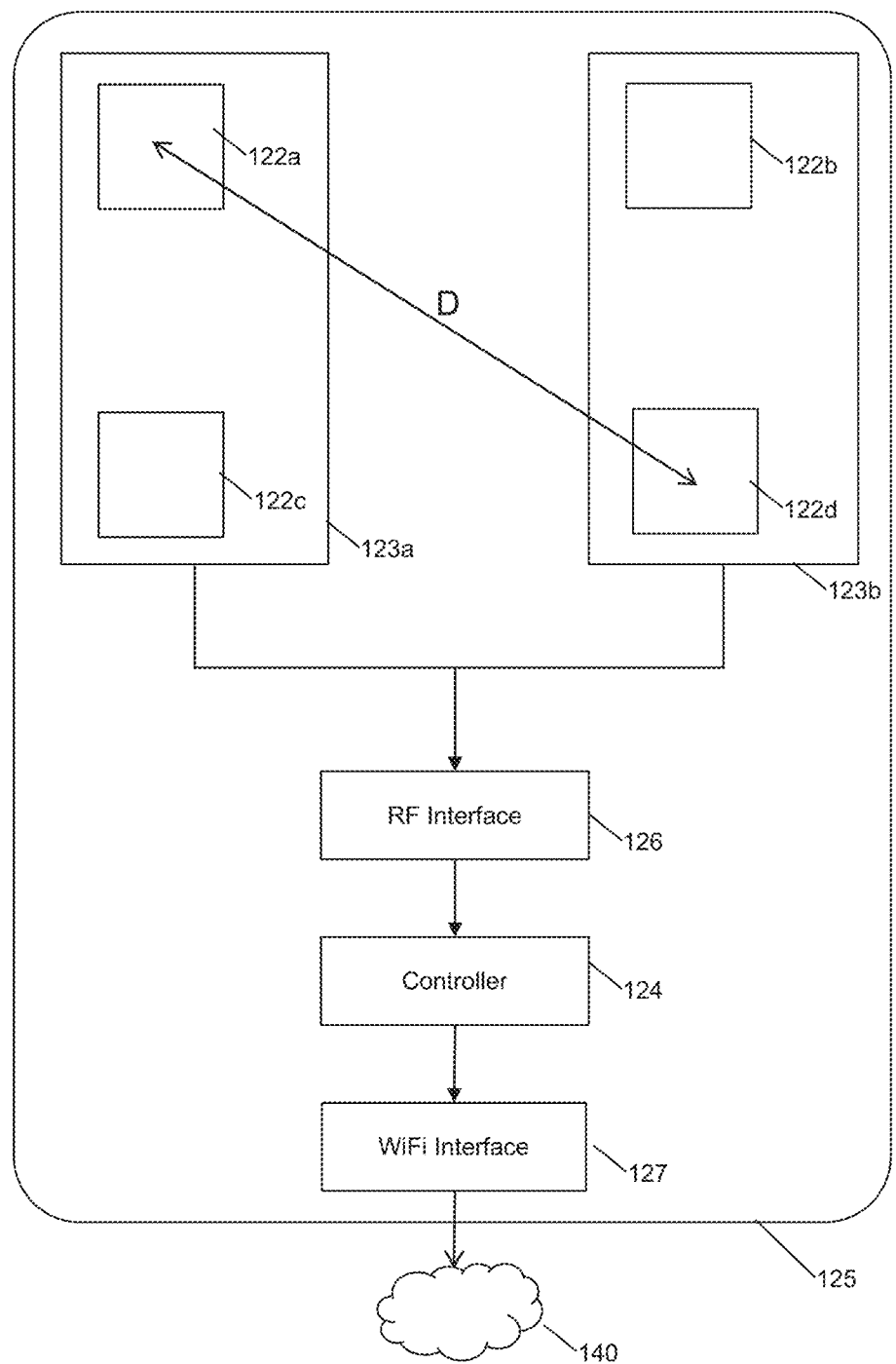
FIG. 6 is a schematic view of an example node of the location detection apparatus.

FIG. 6 is a schematic view of one of the radio receptor nodes 125. In this example, each node 125 includes a plurality of radio antennas 122a-122d. At least two of the antennas which are spaced apart from each other by at least a distance D. In one example, the node 125 comprises three separate antenna 122a-c. In another example, the node 125 comprises four separate antennas 122a-d. Other numbers of antennas may also be applicable in other embodiments.

By simulation, the power nulls illustrated in FIG. 5 are found to lie approximately 0.5 m to 1 m apart from each other and each power null is approximately 25 cm across, for an 869 MHz transmitter. Taking the width of the power null as being approximate to the distance D, the multiple individual antennas 122a-d will experience either a local maximum and a local minimum, respectively, or else will see similar powers at each antenna. Again, the simulation results indicate that the wide-surface average from an array with many antennas is within approximately 3 dB of the level of the single strongest ray and the wide-surface maximum from an array with many antennas is within approximately 8 dB of the level of the single strongest ray. Therefore, the multi-antenna array 122a-d includes antennas which are separated by the distance D corresponding to the approximate width of the power null. In this environment the multi-antenna will report a received signal strength with significantly lower variability when compared to a single antenna in the same location.

Each of the antennas 122a-d may be carried on a substrate such as a printed circuit board. In one example, one or more of the antennas 122a, 122b are located on a first board 123a while other of the antennas 122c, 122d are located on a second board 123b, making separation of the antennas by the distance D more convenient. In one example, one or more of the antennas may be coupled to a main board by a flying lead wire, e.g. being configured with a relatively small and neat main housing linked to one or more satellite-type antenna housings.

Suitably, the node 125 further comprises a controller 124, such as a computer processor, arranged to process the signals received from the multi-antenna array 122a-d. The antennas 122a-d may be coupled to the controller 124 via an RF interface 126. In one example, the controller 124 determines the maximum power for each of the individual antennas 122a-d and then processes that information to derive the received signal strength value which is reported from this node 125 to the location finder 105.

In this example, the nodes 125 are each coupled to a backhaul network 140 for transferring the established RSSI values to the location finder 105. In one example, the backhaul network 140 uses the Internet. The node 125 may include a local wireless communication interface 127, such as a Wi-Fi interface, allowing a local connection over Internet Protocol and/or a connection to the Internet such as via a local Wi-Fi wireless router or similar technology. In one example, the location finder unit 105 may be located in the dwelling 12, such as by being incorporated within the client unit 100. In another example, the location finder 105 may be located remotely from the dwelling 12, such as by being hosted in the server 200 at the monitoring center 201 or any other suitable cloud hosting arrangement.

As noted above, the nodes 125 are suitably distributed around the dwelling 12 to be monitored. In one example, one of the nodes 125 may be integrated within the client unit 100. That is, the client unit 100 may be configured to incorporate the components illustrated in FIG. 6 and thus act as one of the nodes 125 of the location finding system.

In use, each node 125 suitably reports one or more RSSI values which are established after detecting the radio transmission from the trigger 110. In one example, the radio transmissions from the personal radio trigger unit 110 are coded, and thus the node 125 is able to distinguish a valid radio transmission from other system components or background RF interference, or distinguish one trigger 110 from another. In one example, the node 125 may be arranged not only to receive the transmission but also to decode and examine the content of the transmission.

In use, each node 125 is exposed to the incoming radio transmissions and will sample the signal power level for a brief period of time on each antenna. In one example, each node 125 obtains N samples per antenna, where N is a positive integer, and these N samples are used to compute an average of the power for the respective antenna. These N power averages may then be combined to provide an average power value as appropriate for that node 125 as a reported RSSI value. Other algorithms are also possible, such as selecting only the maximum or minimum observed value.

Figure 7:
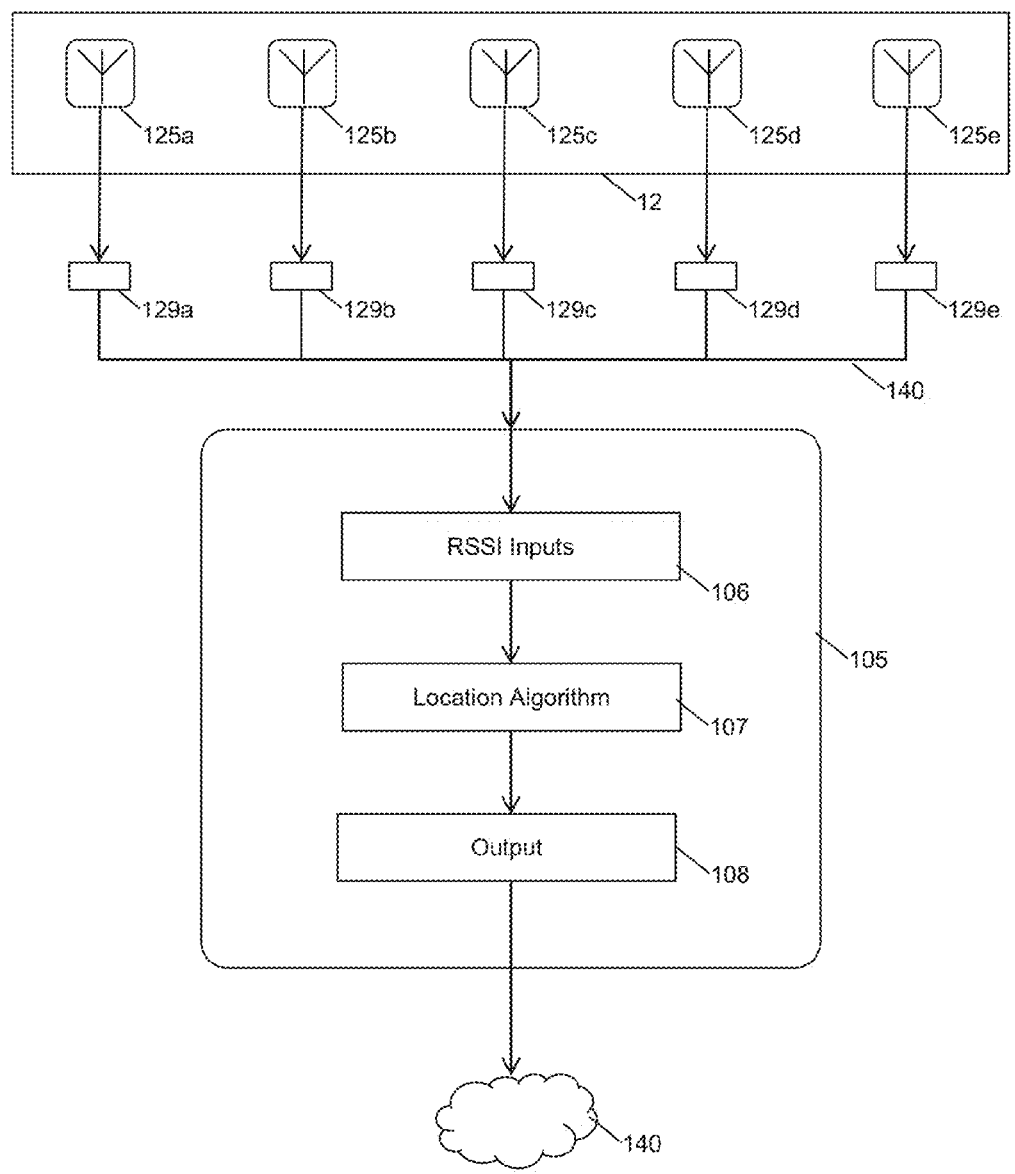
FIG. 7 is another schematic view of the example location detection apparatus.

FIG. 7 illustrates components of the location finder unit 105. In this example there are five nodes 125a-125e but any suitable number of nodes may be used for a particular dwelling 12. An input unit 106 receives the RSSI values 129a-129e as reported from each of the plurality of nodes 125a-125e over the backhaul network 140. A processor 107 applies a location detection algorithm to the received values to determine a location of the trigger 110. An output unit 108 provides a detection result to be used by downstream apparatus, such as providing the detected location information to the operator console 210, or passing the location information back to the client unit 100, or providing the location information to equipment carried by a responder such as a caregiver or medic, e.g. via an SMS message or an App on a smartphone. In this example, the same backhaul network 140 may be used to report the location but many other specific implementations will be possible based on the teachings herein.

Figure 8:
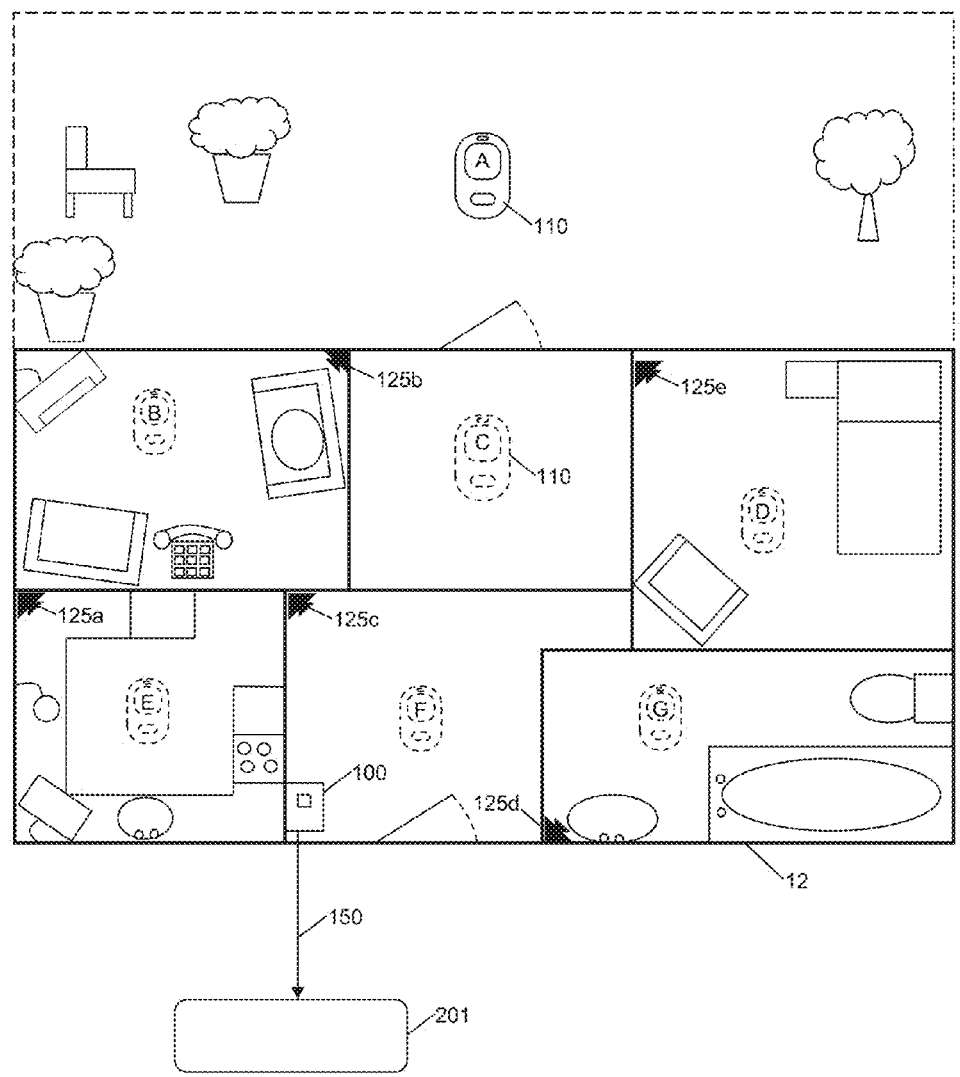
FIG. 8 is a schematic plan view of an example dwelling with the social alarm system and the location detection apparatus installed therein.

FIG. 8 illustrates an experimental dwelling 12 for illustration. The location system firstly operates in a learning mode to observe radio transmissions from the trigger 110 in one or more known locations A, B, C, D. etc. around the dwelling 12. Each radio transmission provides a corresponding set of RSSI values 129a-e from the respective nodes 125a-e. An 'out of range' observation is observed when the trigger 110 is not present in the dwelling 12.

The location finder unit 105 suitably uses a look-up table to determine the current location by comparing the observed readings against one or more previously obtained and stored readings. Any suitable number of sample observations may be gathered from any suitable number of known locations. Table 1 below shows learning observations for each node 'a'-'e' with the trigger 110 at a particular location 'A'. In the learning mode, a plurality of learning observations may be combined to give an average value of the maximum RSSI value (dBm):

TABLE 1

Experimental results

| Node | node max | node max | node max | average |
|---|---|---|---|---|
| 'a' | −74 | −70 | −70 | −71.3 |
| 'b' | −85 | −76 | −78 | −79.7 |
| 'c' | −102 | −90 | −96 | −96.0 |
| 'd' | −85 | −78 | −76 | −79.7 |
| 'e' | −78 | −76 | −78 | −77.3 |

The learning mode is suitably conducted prior to a running mode. In the running mode, an unknown current location of the trigger 110 is to be determined by comparison against the set of previously established locations and their respective results. In use the system may at intervals toggle between the learning mode and the running mode in order to build up a larger set of training observations or to refresh or confirm the previously observed values.

Figure 9:
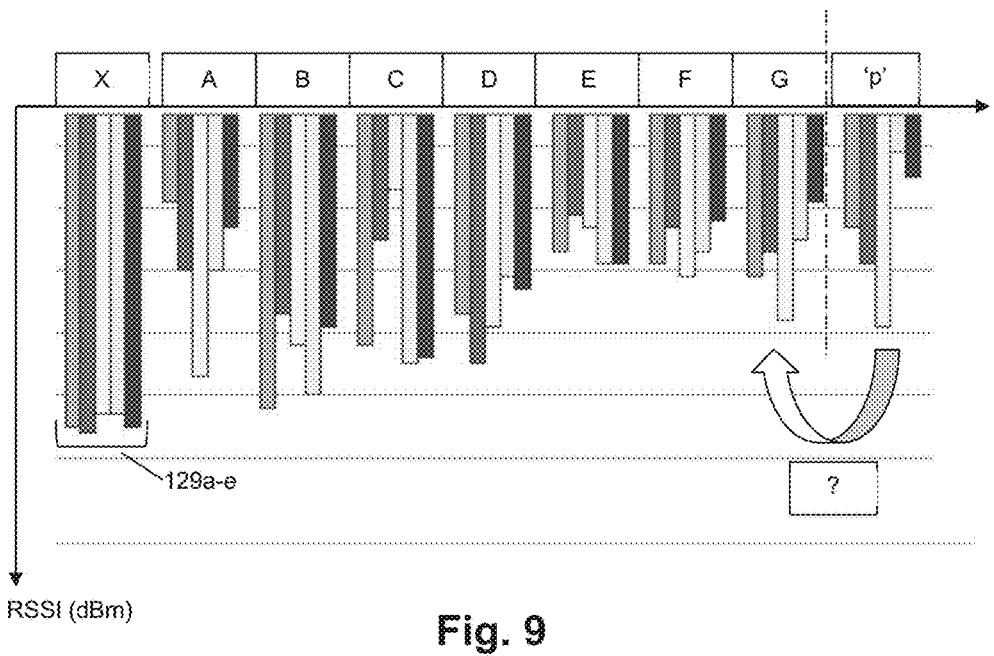
FIG. 9 is a chart showing example signal values.

FIG. 9 is a graph of example experimental results. Each observation gives respective RSSI values 129a-e, in this case with a lower signal strength giving a larger negative value on the graph. The out of range value set 'X' is shown on the left for comparison. Sending a radio transmission from the trigger 110 at each of these known locations A-G produces a respective pattern of results from the nodes 125a-e. Each of these patterns is established in the learning mode, from one or more learning observations at those known locations. Given the number of nodes 125 as 'M' and the number of locations as 'L', wherein L and M are positive integers, in the running mode the location algorithm attempts to match a currently observed data set 'S' as a best-fit amongst the plurality of known data sets.

In the example embodiments, a match is to be found quickly and efficiently, and with a high degree of reliability. Thus, a pattern matching algorithm is employed in order to first establish a degree of error as between the current observation set S and the set of M recorded observations for each of the L known locations.

In one example, a first error calculation is performed to calculate an absolute power error, being the difference in power as between each of the observed power levels and each of the respective power levels in each recorded set. The absolute power error finds an absolute difference between the power levels and gives a numerical value for each of the known locations. The current location of the trigger unit 100 may be inferred as being closest to the known location having the smallest numerical error. Given the seven example known locations A-G in the look-up table, each one gives a numerical error value and it may be determined that the trigger unit is most likely to be located nearest to the location which gives the smallest error. In one example, the absolute power error may be calculated using a root mean square (RMS) error calculation such as according to Equation 1:

$$\text{Abs\_power\_error}(p) = \sqrt{\frac{\Sigma_{k=1}^{M} [\text{MAX}(\text{Node}(k)) - LUT(k, p)]^2}{M}} \quad \text{(Eq. 1)}$$

In this example, 'k' is the Node ID position (corresponding to 125a . . . e)=1 . . . M (all tried during a particular 'p' trial). 'p' is the Location ID fit to be evaluated=1 . . . L' (for obtained S). The set of observed results S=Node(1 . . . M), and the term LUT is the Look Up Table of reference Node powers, for the known locations 1 . . . L.

Figure 10:
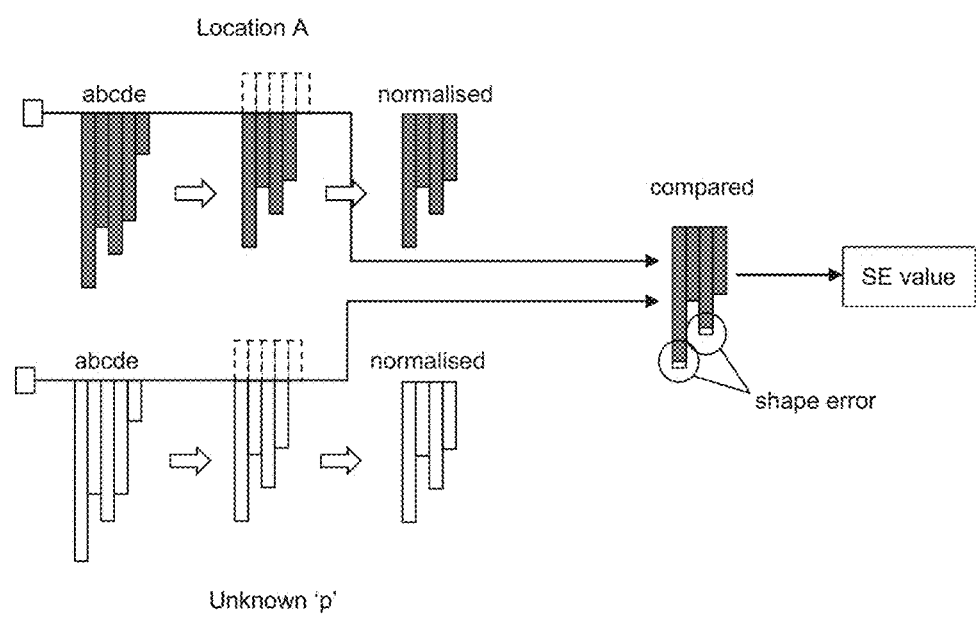
FIG. 10 is a schematic view of an example location finding algorithm.

In another example, a second type of error calculation may be performed to calculate a shape error, wherein a shape of the observed power levels is compared against a shape of the recorded power levels for each of the known locations. Looking at FIG. 9, it will be appreciated that the set of power levels from each of the nodes M for a known location when arranged in a consistent order can be compared with the observed power levels in the same order. In this example, the power levels are first normalized to the level of the strongest node in this sample set. Again considering the example system with five nodes 125a-125e, each sample set respectively contains five power level values. Likewise the observed signal has five values and the nodes can be arranged in the same order, e.g. a,b,c,d,e. As graphically shown in FIG. 10, both original data sets are normalized, in this case to the strongest value in each set. Then, the normalized power levels are compared to calculate a shape error value similarly to the absolute error value above. In one example this shape error calculation may use Equations 2, 3 and 4 below:

$$\text{Node\_Norm} = \text{Node} - \text{MAX}(\text{Node}(1 \ldots M)) \quad \text{(Eq. 2)}$$

$$LUT\_\text{Norm}(p,1 \ldots M) = LUT(p,1 \ldots M) - \text{MAX}(LUT(p,1 \ldots M)) \quad \text{(Eq. 3)}$$

$$\text{Shape\_error}(p) = \quad \text{(Eq. 4)}$$

-continued $$\sqrt{\frac{\Sigma_{k=1}^{M} [\text{MAX}(\text{Node\_Norm}(k)) - LUT\_\text{Norm}(k, p)]^2}{M}}$$

In a further example, the absolute power error and the shape error values may be combined together to give a combined error value. This combination reduces variability and improves accuracy in determining the most appropriate (i.e. least error) location from amongst the set of recorded values. A discussed above, radio frequency transmissions in a dense and reflective environment such as a dwelling have relatively high variability and thus finding an accurate best match is not so straightforward. In one example a weighting coefficient is applied to each of the calculated error values, so that the relative contribution of the two (or more) calculated values may be varied in the final error calculation. In one example the fit error value is calculated according to equation 5 below, wherein 'SE' and 'AP' are the weighting coefficients:

$$LUT\_\text{fit\_error}(p) = SE \cdot \text{Shape\_error}(p) + AP \cdot \text{Abs\_power\_error}(p) \quad \text{(Eq. 5)}$$

The calculated error value may be reported as a probability that the trigger 110 is in or is close to each of the known locations. The location having the highest probability may then be determined as being the (approximate) current location of the trigger 110. As a further refinement, a threshold may be applied in order to firstly eliminate certain of the locations before then making a selection amongst the remainder.

It will be appreciated that the location finder apparatus is capable of distinguishing between various locations in and around the dwelling with good accuracy. In the learning mode an engineer may move around the house operating the trigger 110 from a series of locations which are each associated with the respective observations in the location finder 105 to build the look up table. These values are then retrieved in the running mode and used in the error calculations noted above. Typically, it is expected that 5 to 10 locations may be established in this way and may be labelled appropriately. e.g. 'kitchen', 'lounge', 'bedroom', 'garden' and so forth.

Figure 11:
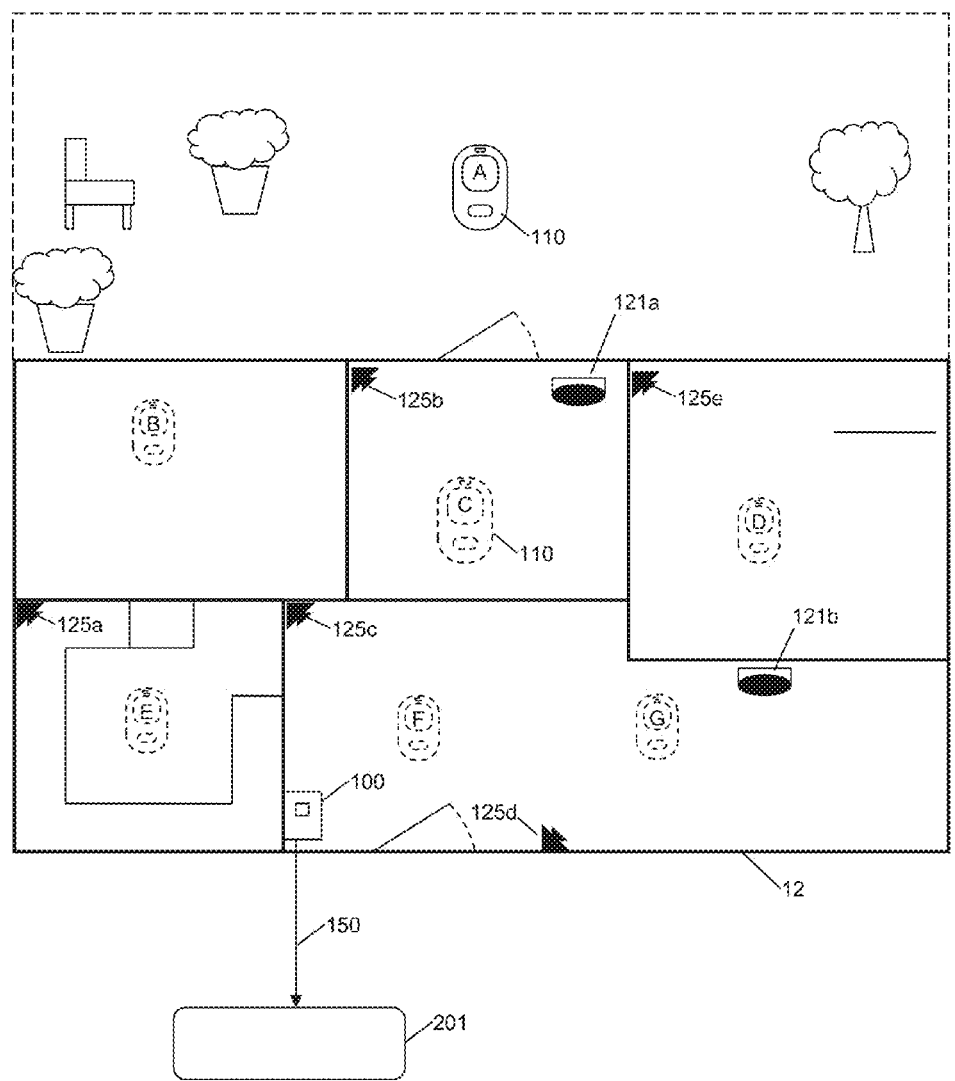
FIG. 11 is another schematic plan view of an example dwelling with the social alarm system and the location detection apparatus installed therein.

FIG. 11 is a further schematic view of an example dwelling 12 in which the location system is installed. In this example, one or more additional anchor transmitters 121 are provided at fixed locations within the dwelling. These fixed transmitters 121a, 121b transmit radio transmissions similar to the trigger 110 and are recognized by the location system using the nodes 125 as described above. Conveniently, the fixed transmitters 121 are installed in the dwelling when the system is commissioned and the system now gathers observations of the signals sent by the fixed transmitters 121. In the running mode, when the trigger 110 is co-located with one of the fixed transmitters 121a then the observed results 'p' should closely match the power levels as observed from the respective transmitter 121a, allowing a more accurate determination. In one example, these anchor transmitters 121 allow the system to track changes in the environment over time. When the location of the transmitter 121 is fixed and any changes in the observed signals presumably are due to the environment. Thus the recorded values in the location finder unit 105 can be updated. This example allows a limited self-calibration of the system. e.g. when instructed by an operator or an automatic and/or a periodic re-calibration.

Figure 12:
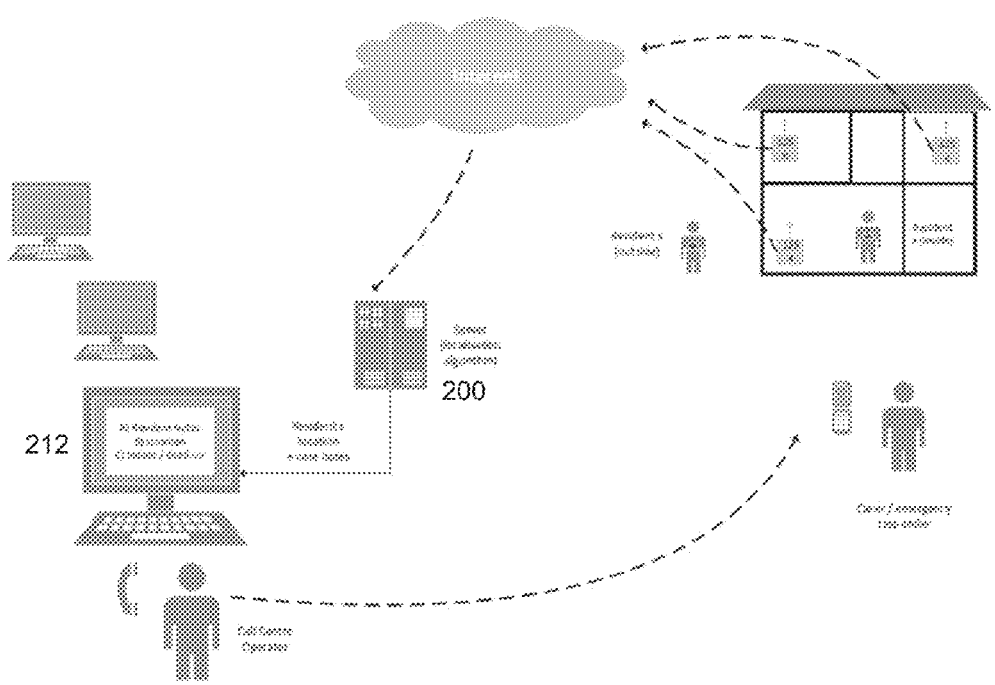
FIG. 12 is a schematic view of the example system in operation.

FIG. 12 is a further schematic view of the example social alarm system and location finder apparatus. There is a difficulty in that the location of the client has to be determined quickly, especially in an emergency situation. Also, this example allows the determined location to be understood easily and communicated simply and quickly, such as from the operator at the monitoring center 201 to a medical responder who attends the client's dwelling. There is a significant challenge in considering how the system should produce and convey an appropriate location result.

In this example, the system is arranged to make a binary determination of the location as being either inside or outside at the dwelling. That is, the system determines that the trigger 110 is present at the dwelling (because it is within radio range) and then uses the location finder to distinguish whether the trigger is at this moment inside or outside. By establishing at least one of the known locations as being outside the dwelling, e.g. in a garden or yard, the system can then determine location both within and around the main house of the dwelling. Therefore, the responder can be directed to search the location either inside or outside the dwelling, to find the client confidently and quickly. However, this binary determination is also simple and easy for communication between the operator and the responder, by whatever communication devices are employed for that route, and the message is unlikely to become corrupted or misunderstood.

As in FIG. 12, the location finder unit 105 in this case operates on a server 200 at the remote monitoring center 201 to receive the RSSI data 129 as reported by the antenna nodes 125. The server 200 may retrieve information about the client (e.g. resident notes) in response to the alarm call from the client unit 100. The personal radio trigger unit 110 will typically have initiated the alarm event and these signals are used opportunistically for the location detection. In one example, the system may be configured to instruct the trigger unit 110 to make signal transmissions specifically for location detection, e.g. commanded by the server 200 via the client unit 100 to the trigger 110. The location finder unit 105 receives the RSSI data 129 as reported by the antenna nodes 125 over the data channel 140 and makes a location determination.

As shown in FIG. 12, the server 200 may cause the operator terminal 210 to display a location report with the simple binary distinction between 'inside' and 'outside'.

In one example, a more detailed location report may be provided. In one example, the system determines the most likely location in the manner noted above. In one example a first and a second locations may be reported, such as in a ranked order of probability (e.g. 'most likely in location C, 2nd most likely in location E'). Thus, the relative confidence is implicit in the ranking. In another example, an explicit confidence value may be reported, e.g. based on the error values calculated above.

Figure 13:
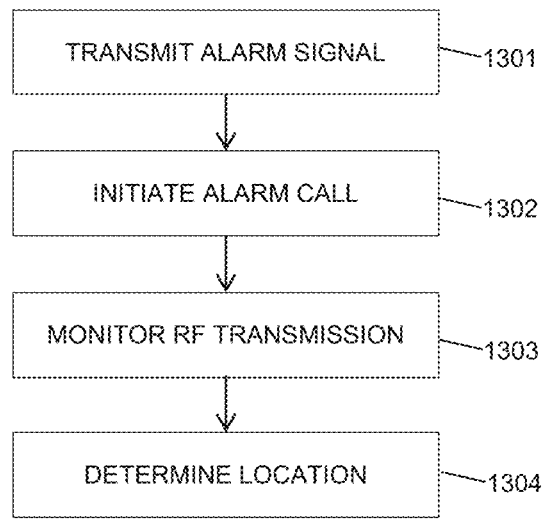
FIG. 13 is a flowchart of an example method of location finding for the social alarm system.

FIG. 13 is a flowchart of an example method of location finding in a social alarm system such as of the type described herein. Step 1301 comprises transmitting an alarm signal by wireless radio frequency transmission in response to a triggering alarm event. The alarm signal is sent from a personal radio trigger carried by a client in the dwelling. Step 1302 comprises receiving the alarm signal at a client unit in the dwelling and initiating an alarm call to a remote monitoring center over a communications network. Step 1303 comprises monitoring the wireless radio frequency transmissions from the personal radio trigger by a plurality of radio receptor nodes to report at least one respective received signal strength value. Step 1304 comprises determining a location of the personal radio trigger in the dwelling according to the received signal strength values reported from the plurality of radio receptor nodes. These steps may further include any of the operations discussed above.

Figure 14:
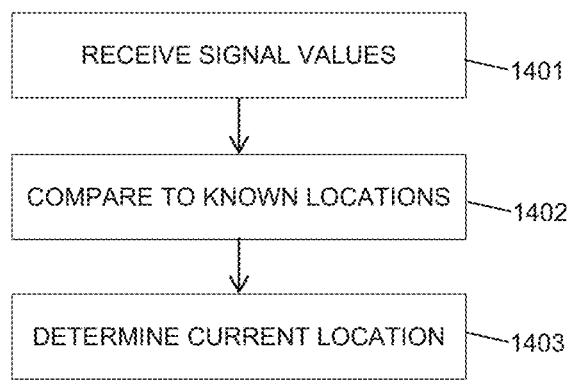
FIG. 14 is a flowchart of another example method of location finding for the social alarm system.

FIG. 14 is a flowchart of another example method of location finding in a social alarm system. Step 1401 comprises receiving observed signal values from a plurality of radio receptor nodes which monitor wireless radio transmissions from a personal radio trigger in the dwelling. Step 1402 comprises comparing the observed values against previously recorded values according to a plurality of known locations in the dwelling. Step 1403 comprises determining or selecting a current location of the personal radio trigger from amongst the plurality of known locations.

The industrial application of the present invention will be clear from the discussion above. Likewise, the many advantages of the invention will be apparent from these embodiments and/or from practicing the example embodiments of the invention.

Although a few preferred embodiments have been shown and described, it will be appreciated by those skilled in the art that various changes and modifications might be made without departing from the scope of the invention, as defined in the appended claims.

What is claimed is:

1. A social alarm system with location detection in a dwelling, comprising:
   a personal radio trigger configured to be carried by a client in the dwelling and operable to transmit an alarm signal by wireless radio frequency transmission in response to a triggering alarm event;
   a client unit operable to receive the alarm signal and initiate an alarm call to a remote monitoring center over a communications network;
   a plurality of radio receptor nodes operable to monitor the wireless radio frequency transmissions from the personal radio trigger, each radio receptor node being configured to report at least one respective received signal strength value; and
   a location finder unit operable to determine a location of the personal radio trigger in the dwelling according to the received signal strength values reported from the plurality of radio receptor nodes;
   wherein the location finder unit is configured to perform a location finding algorithm comprising: receiving a set of observed signal strength values from the plurality of radio receptor nodes, comparing the set of observed signal strength values against sets of previously recorded signal strength values from a plurality of known locations in the dwelling, and thereby determining a current location of the personal radio trigger in the dwelling from amongst the plurality of known locations.

2. The social alarm system of claim 1, wherein the plurality of radio receptor nodes are distributed at separate locations around the dwelling.

3. The social alarm system of claim 1, wherein at least one of the radio receptor nodes comprises a plurality of antennas as a multi-antenna array.

4. The social alarm system of claim 3, wherein the plurality of radio antennas in the radio receptor node are spaced apart from each other by a distance D corresponding to a local null of the wireless radio transmissions in the dwelling.

5. The social alarm system of claim 3, wherein at least one of the plurality of antennas is separated from a main board of the radio receptor node and connected thereto by a flying lead wire.

6. The social alarm system of claim 3, wherein each of the radio receptor nodes further comprises a controller operable to determine a received signal level from each of the plurality of antennas of that radio receptor node and to derive the received signal strength value therefrom as reported by the respective radio receptor node to the location finder unit.

7. The social alarm system of claim 1, wherein the radio receptor nodes are coupled to the location finder unit by a backhaul network which is distinct from the wireless radio transmissions.

8. The social alarm system of claim 1, wherein the location finder unit is provided in a server apparatus remote from the dwelling.

9. The social alarm system of claim 1, wherein the location finding algorithm further comprises: arranging the observed signal strength values from the plurality of nodes into a predetermined pattern, and comparing the arranged pattern of the observed signal strength values against likewise arranged patterns of the previously recorded signal strength values for the plurality of known locations in the dwelling.

10. The social alarm system of claim 9, wherein the location finder unit stores a set of power levels from each of the plurality of nodes for each of the observed recorded values, wherein the set of power levels are ordered by location of the nodes and the observed signal values are provided in the same location order.

11. The social alarm system of claim 9, wherein the location finding algorithm selects amongst the known locations according to absolute power levels from each of M said radio receptor nodes for each of a set of L known locations, where L and M are positive integers, against the current observed signal values according to provide an absolute power error against the current observed signal values 'p' according to the equation:

$$\text{Abs\_power\_error}(p) = \sqrt{\frac{\sum_{k=1}^{M}[\text{MAX}(\text{Node}(k)) - \text{LUT}(k, p)]^2}{M}}. \quad \text{(Eq. 1)}$$

12. The social alarm system of claim 9, wherein the location finding algorithm selects amongst the known locations according to normalized power levels from each of the M radio receptor nodes for each of the set of L known locations, where L and M are positive integers, against the current observed signal values 'p' according to provide a shape power error according to the equations:

$$\text{Node\_Norm} = \text{Node} - \text{MAX}(\text{Node}(1 \ldots M)) \quad \text{(Eq. 2)}$$

$$\text{LUT\_Norm}(p,1 \ldots M) = \text{LUT}(p,1 \ldots M) - \text{MAX}(\text{LUT}(p,1 \ldots M)) \quad \text{(Eq. 3), and}$$

$$\text{Shape\_error}(p) = \quad \text{(Eq. 4)}$$

$$\sqrt{\frac{\sum_{k=1}^{M}[\text{MAX}(\text{Node\_Norm}(k)) - \text{LUT\_Norm}(k, p)]^2}{M}}.$$

13. The social alarm system of claim 12, wherein the location finding algorithm selects amongst the known locations according to a combined error value based on both of the absolute power error and the shape power error.

14. The social alarm system of claim 9, wherein the location finder unit is operable to report two or more of the selected known locations as being the current location of the personal radio trigger with a relative confidence rating for each said known location.

15. The social alarm system of claim 1, wherein the social alarm system further comprises one or more anchor transmitters arranged at fixed locations in the dwelling and operable to emit the wireless radio transmissions similar to the personal radio trigger, and wherein the location finder unit is further operable to compare the observed signal values against observations of the anchor transmitters when determining a location of the personal radio trigger in the dwelling.

16. The social alarm system of claim 1, wherein the location finder unit is operable to make a binary determination of location of the personal radio trigger as being in one of 'inside' or 'outside' at the dwelling.

17. The social alarm system of claim 1, wherein the personal radio trigger is operable to emit the wireless radio transmission using a reserved frequency band in the range 100 MHz to 1 GHz.

18. The social alarm system of claim 1, wherein the personal radio trigger is configured as a pendant to be worn by the client and comprises an alarm button operable to manually initiate the triggering alarm event and/or a fall detector circuit operable to automatically initiate the triggering alarm event.

19. A method of location finding in a dwelling by a social alarm system, comprising:
  transmitting an alarm signal by wireless radio frequency transmission in response to a triggering alarm event from a personal radio trigger carried by a client in the dwelling;
  receiving the alarm signal at a client unit and initiating an alarm call to a remote monitoring center over a communications network;
  monitoring the wireless radio frequency transmissions from the personal radio trigger by a plurality of radio receptor nodes to report at least one respective received signal strength value; and
  determining a location of the personal radio trigger in the dwelling by performing a location finding algorithm comprising: receiving a set of observed signal strength values from the plurality of radio receptor nodes, comparing the set of observed signal strength values against sets of previously recorded signal strength values from a plurality of known locations in the dwelling, and thereby determining a current location of the personal radio trigger in the dwelling from amongst the plurality of known locations.

20. The method of claim 19, further comprising:
  comparing the received signal values against previously stored values for a plurality of known locations in the dwelling to derive an error value for each location; and
  selecting a current location of the personal radio trigger from amongst the plurality of known locations in the dwelling according to the error values.

* * * * *